(12) United States Patent
Takebe et al.

(10) Patent No.: US 7,842,748 B2
(45) Date of Patent: Nov. 30, 2010

(54) MASTER BATCH COMPOSITION, POLYOLEFIN RESIN COMPOSITION COMPRISING THE SAME, AND MOLDED PRODUCT THEREOF

(75) Inventors: Tomoaki Takebe, Chiba (JP); Yutaka Minami, Chiba (JP); Tsutomu Onodera, Chiba (JP); Motoki Yamada, Chiba (JP)

(73) Assignee: Idemitsu Kosan Co., Ltd., Tokyo (JP)

( * ) Notice: Subject to any disclaimer, the term of this patent is extended or adjusted under 35 U.S.C. 154(b) by 100 days.

(21) Appl. No.: 11/720,298

(22) PCT Filed: Nov. 22, 2005

(86) PCT No.: PCT/JP2005/021489

§ 371 (c)(1),
(2), (4) Date: May 25, 2007

(87) PCT Pub. No.: WO2006/057260

PCT Pub. Date: Jun. 1, 2006

(65) Prior Publication Data
US 2008/0119605 A1    May 22, 2008

(30) Foreign Application Priority Data

Nov. 26, 2004    (JP)    .............................. 2004-342891
May 10, 2005    (JP)    .............................. 2005-137182

(51) Int. Cl.
*C08L 23/00*    (2006.01)
*C08L 23/04*    (2006.01)

(52) U.S. Cl. ....................................... 524/528; 525/240
(58) Field of Classification Search .................. 524/528
See application file for complete search history.

(56) References Cited

U.S. PATENT DOCUMENTS

2003/0040583 A1 *    2/2003    Washiyama et al. ......... 525/240
2004/0076804 A1 *    4/2004    Kijima et al. ............ 428/195.1

FOREIGN PATENT DOCUMENTS

EP    1 340 784    9/2003
JP    2002 210735    7/2002

* cited by examiner

*Primary Examiner*—Ling-Siu Choi
*Assistant Examiner*—Hui Chin
(74) *Attorney, Agent, or Firm*—Oblon, Spivak, McClelland, Maier & Neustadt, L.L.P.

(57) ABSTRACT

The present invention pertains to a master batch composition which contains 10 to 95% by mass of an additive for plastics, 1 to 50% by mass of an olefin polymer having specific physical properties, and 1 to 89% by mass of a polyolefin resin as a carrier, which is useful for producing a polyolefin resin, particularly an injection molded product of a polypropylene resin, which can improve dispersibility of additives in the polyolefin molded product, which permits high density filling of various additives in the master batch composition, and which is free of blocking. The present invention is also directed to a polyolefin resin composition in which the master batch composition is compounded in a polyolefin resin, and to a polyolefin molded product using the resin composition.

26 Claims, No Drawings

US 7,842,748 B2

MASTER BATCH COMPOSITION, POLYOLEFIN RESIN COMPOSITION COMPRISING THE SAME, AND MOLDED PRODUCT THEREOF

TECHNICAL FIELD

The present invention relates to a master batch composition, to a polyolefin resin composition containing the master batch composition, and to a polyolefin molded product obtained using the resin composition. More specifically, the present invention is directed to a master batch composition containing an additive for plastics, an olefin polymer having specific physical properties and a polyolefin resin as a carrier in specific amounts, to a polyolefin resin composition containing the master batch composition, and to a polyolefin molded product, particularly an injection molded product for use as interior and exterior materials for automobiles, using the resin composition.

BACKGROUND ART

Polypropylene resins are widely used because of their excellent rigidity and impact resistance. In particular, molded products obtained by molding, such as injection molding, of a polypropylene resin composition are now used for automotive materials. These molded products are required to have excellent appearance, such as sense of togetherness with an automotive body, upscale image and high grade design, as well as mechanical characteristics such as rigidity and impact resistance. Additionally, the molded products are required to be produced with high efficiency to attain reduction of costs.

On the other hand, an attempt has been made to improve the physical properties of molded products and production efficiency by compounding a previously produced master batch composition containing additives such as a pigment for coloring, a softening agent, a filler and a mold releasing agent, in a relatively high concentration in a polypropylene resin as a material to be molded and by producing the molded products using the compounded resin.

With regard to the above method, a method is known in which the same polypropylene resin as that for the material to be molded is used as a carrier resin of the master batch composition. Since the same polypropylene resins show good compatibility therebetween, the master batch composition is considered to be highly dispersed in the polypropylene resin and to improve the appearance. With the above method, however, since the polypropylene resin used for injection molding has a high molecular weight and, therefore, a high melt viscosity, a problem occurs that kneading efficiency and shapability become poor when the content of the pigment is about 30% by weight or more. Further, because of high crystallinity and high crystallization rate, it is not possible to increase the amount of the additives since, otherwise, phase separation between the additives and the polypropylene resin carrier proceeds. Therefore, the production efficiency cannot be improved. Additionally, since additives such as a lubricant, an antistatic agent, a heat stabilizer and a UV absorbing agent have a lower melt viscosity than the polypropylene resin, a drawback that kneading cannot sufficiently proceed in an extruder for producing the resin composition is caused.

An attempt is also made to use a polypropylene wax having a reduced molecular weight as a carrier of a master batch. The above-described problem with respect to the melt viscosity is overcome by this method. However, because of the high crystallinity and, therefore, high melting point, a blowing agent, a modifier, a crosslinking agent, etc. are unavoidably fused and kneaded at a high temperature during the production of the master batch composition. As a result, there is a drawback that these additives undergo chemical changes to cause foaming, crosslinking, decomposition and grafting. In particular, when additives such as a flame retardant, a blowing agent, a deodorant, an antibacterial/antifungal agent are subjected to a high temperature during the melt processing of the polyolefin resin, the chemicals and additives evaporate or sublime so that a drawback that the amounts of the effective components are considerably reduced is unavoidably caused. Furthermore, because of the high crystallization rate, a problem that high density filling of these additives cannot be made is not overcome.

There is proposed a method in which an atactic polypropylene is used as a carrier resin with a low molecular weight and a low melting point for a master batch. In this case, a pigment can be dispersed in a high concentration in the master batch composition and, therefore, the costs for a coloring process can be reduced. However, while the atactic polypropylene is a by-product in the preparation of polypropylene and has a merit that it is available at a low price, residues such as a catalyst and a solvent are contained therein in a large amount. Thus, there are problems because generation of odors and coloration are caused at the time the master batch composition is prepared and because the color tone of molded products obtained from the master batch composition subtly varies to cause difficulty in color matching the molded products. Further, because the atactic polypropylene is a by-product, the physical properties thereof such as melt viscosity greatly vary. Therefore, there is a problem that the fluidity is unstable at the time of kneading and that the process efficiency is deteriorated. There are proposed a method for producing an antistatic master batch (see, for example, Patent Document 1) and a method for producing a coloring or modifying master batch (see, for example, Patent Documents 2 and 3) using such an atactic polypropylene as a carrier. These methods, which use an atactic polypropylene being a by-product in the preparation of polypropylene as a raw material, have the aforementioned defects. Use of an amorphous polyolefin random copolymer, produced as a desired product rather than as a by product, as a carrier resin for a master batch is also proposed (see, for example, Patent Documents 4 and 5). The copolymer, which is obtained using a heterogeneous catalyst, however, has wide molecular weight distribution and compositional distribution. Namely, the copolymer contains crystalline, high molecular weight components having a high melting point and amorphous, low molecular weight components having a low melting point. Since the low molecular weight components act as tacky components, the copolymer causes problems that master batch pellets are adhered to each other and molded product obtained are susceptible to blocking. In the above proposals, it is described that the use of an anti-block agent is preferred when there is tackiness. When molded products are tacky, releasability thereof from molds at the time of injection molding is reduced to cause reduction of the process efficiency and deterioration of appearance.

Further, a colored resin composition using a polypropylene wax obtained with a metallocene catalyst as a dispersing agent is proposed (see, for example, Patent Documents 6 and 7). The wax, however, has a melting point of 90° C. at minimum. A carrier for a master batch having a still lower melting point is desired for the purpose of prevention of deterioration and reaction of additives used. The wax used in the above proposal is one having a reduced melting point by copolymerizing with ethylene, etc. In order to reduce the melting point, it is necessary that the copolymer should have a high ethylene content. Thus, a problem that the compatibility with a polypropylene resin is lowered is caused.

[Patent Document 1] Japanese Unexamined Patent Application Publication No. S62-62836

[Patent Document 2] Japanese Unexamined Patent Application Publication No. S52-126449

[Patent Document 3] Japanese Unexamined Patent Application Publication No. S53-67750

[Patent Document 4] Japanese Unexamined Patent Application Publication No. H01-261440

[Patent Document 5] Japanese Unexamined Patent Application Publication No. H07-82424

[Patent Document 6] Japanese Unexamined Patent Application Publication No. 2003-183447

[Patent Document 7] Japanese Unexamined Patent Application Publication No. 2003-525340

DISCLOSURE OF THE INVENTION

The object is to provide a master batch composition useful for the production of injection molded products of a polyolefin resin, particularly a polypropylene resin, more specifically a master batch composition which can improve dispersibility of additives in a polyolefin molded product, particularly a polypropylene molded product, which permits high density filling of various additives in the master batch composition, which can suppress thermal deterioration and reactions of the various additives during the production of the master batch composition, and which is free of blocking and shows good process efficiency, to provide a polyolefin resin composition containing the master batch composition, and to provide a polyolefin molded product using the resin composition.

The present inventors have made an earnest study with a view toward accomplishing the above objects. As a result, it has been found that a master batch composition containing an additive for plastics, an olefin polymer having specific physical properties and a polyolefin resin as a carrier in specific amounts is free of blocking and shows good process efficiency and that a molded product showing good releasability from molds at the time of injection molding and good process efficiency and having good appearance can be obtained by using a polyolefin resin composition containing the master batch composition. The present invention has been completed on the basis of the above finding.

That is, the present invention has the following constitution:

(1) A master batch composition comprising 10 to 95% by mass of an additive for plastics, 1 to 50% by mass of an olefin polymer which satisfies the conditions (i) to (iii) shown below, and 1 to 89% by mass of a polyolefin resin as a carrier, (i) the polymer has a mesopentad fraction [mmmm] of 20 to 80 mol %, (ii) the polymer has a melting point (Tm-D) of 0 to 100° C., defined as a peak top of a peak observed at the highest temperature side in a fusion endothermic curve obtained using a differential scanning calorimeter (DSC) by holding a sample at −10° C. for 5 minutes under a nitrogen atmosphere and then elevating the temperature at a rate of 10° C./minute, (iii) the polymer has a weight average molecular weight (Mw), measured by a gel permeation chromatography (GPC) method, of 10,000 to 1,000,000 and a Mw/Mn ratio of Mw to Mn of 4 or less, wherein Mn is a number average molecular weight thereof measured by the GPC method.

(2) A master batch composition as defined in (1) above, wherein the olefin polymer is a propylene polymer which additionally satisfies the following condition (iv):

(iv) the polymer has a stereoregularity index [mm] of 50 to 90 mol %.

(3) A polyolefin resin composition comprising a polyolefin resin and a master batch composition of (1) or (2) above compounded therein.

(4) A polyolefin resin composition as defined in (3), wherein the master batch composition of (1) or (2) above is compounded in an amount of 0.1 to 10 parts by mass per 100 parts by mass of the polyolefin resin.

(5) A polyolefin resin composition as defined in (3) or (4) above, wherein the polyolefin resin is a polypropylene resin.

(6) A polyolefin molded product of a polyolefin resin composition as defined in any one of (3) to (5) above.

(7) A polyolefin molded product for automobiles obtained by injection molding of a polyolefin resin composition as defined in any one of (3) to (5) above.

According to the present invention, it is possible to provide a master batch composition useful for the production of an injection molded product of a polyolefin resin, particularly a polypropylene resin, more specifically a master batch composition which can improve dispersibility of additives in a polyolefin molded product, particularly a polypropylene molded product, which permits high density filling of various additives in the master batch composition, which can suppress thermal deterioration and reactions of the various additives during the production of the master batch composition, and which is free of blocking and shows good process efficiency, to provide a polyolefin resin composition containing the master batch composition, and to provide a polyolefin molded product using the resin composition.

BEST MODE FOR CARRYING THE INVENTION

The master batch composition of the present invention is a master batch composition containing an additive for plastics, an olefin polymer having specific physical properties and a polyolefin resin as a carrier in specific amounts.

(A) Additive for Plastics:

As the additive for plastics used in the present invention, there may be mentioned not only generally employed additives used in plastics, such as a pigment, a cross-linking agent, a decomposing agent, a softening agent and a releasing agent, but also other additives such as an antibacterial, antifungal or insecticidal agent, a flame retardant, a blowing agent, a deodorant, a lubricant, an antistatic agent, a heat stabilizing agent, a UV absorbing agent, metal powder and ceramic powder.

As the metal powder, there may be mentioned powder of iron, copper, aluminum, titanium, stainless steel, etc. As the ceramic powder, there may be mentioned oxide-type ceramic powder of zirconia, alumina, etc.

As the pigment, one or more organic and inorganic pigments may be used. Examples of the organic pigment include azo pigments such as azo lake, hansa type, benzimidazolon type, diarylide type, pyrazolon type, yellow type and red type; polycyclic pigments such as phthalocyanine type, quinacridone type, perylene type, perinone type, dioxazine type, anthraquinone type and isoindolinone type; and aniline black. Examples of the inorganic pigment include inorganic pigments such as titanium oxide, titanium yellow, iron oxide, ultramarine blue, cobalt blue, chromium oxide green, chrome yellow, cadmium yellow and cadmium red; and carbon black.

As the cross-linking agent and decomposing agent, there may be mentioned organic peroxides such as t-butylperoxy benzoate, 2,5-dimethyl-2,5-dibutylperoxyhexane, 1,3-bis(t-butylperoxyisopropyl)benzene and 2,2'-azobisisobutyloni-trile.

As the antibacterial, antifungal or insecticidal agent, there may be mentioned compounds such as thiosulfamide, thiophtalimide, bisphenoxy-arsin, thiabendazole or aminobenzimidazol and derivatives thereof.

As the flame retardant, there may be mentioned compounds such as antimony oxide, an organic phosphoric acid ester, chlorendic acid, tetrabromophthalic anhydride and a phosphorus atom- or halogen atom-containing polyol.

As the blowing agent, there may be mentioned compounds such as sodium hydrogen carbonate, dinitrosotetramine, azodicarbonamide, azobisisobutylonitrile, sulfonylhydrazide and sulfonylsemicarbazide and derivatives thereof.

(B) Olefin Polymer:

The olefin polymer is a homopolymer of an olefin or a copolymer of two or more olefins. Specific examples of the olefin include $C_2$ to $C_{20}$ α-olefins such as ethylene, propylene, 1-butene, 1-pentene, 1-hexene, 4-methyl-1-pentene, 3-methyl-1-pentene, 1-octene, 3-methyl-1-butene, 1-nonene, 1-decene, 1-undecene, 1-dodecene, 1-tetradecene, 1-hexadecene, 1-octadecene and 1-eicosene; and $C_3$ to $C_{20}$ cyclic olefins such as cyclopentene, cycloheptene, norbornene, 5-ethyl-2-norbornene, tetracyclododecene, and 2-ethyl-1,4,5,8-di methano-1,2,3,4,4a,5,8,8a-octahydronaphthalene. In addition to these olefins, styrene, vinylcyclohexane and dienes may also be used.

Among the above polymers, polymers containing $C_2$ to $C_6$ olefins as their main constituent units are preferred and propylene polymers containing propylene units as their main constituent units and 1-butene polymers containing 1-butene units as their main constituent units are particularly preferred.

The following propylene polymers are preferred: propylene homopolymer and copolymers of propylene and ethylene or $C_4$ to $C_{20}$ α-olefins having a propylene content of 50 to 100 mol % and an ethylene or $C_4$ to $C_{20}$ α-olefin content of 0 to 50 mol %; preferably propylene homopolymer and copolymers of propylene and ethylene or $C_4$ to $C_{20}$ α-olefins having a propylene content of 70 to 100 mol % and an ethylene or $C_4$ to $C_{20}$ α-olefin content of 0 to 30 mol %; more preferably propylene homopolymer and copolymers of propylene and ethylene or $C_4$ to $C_{20}$ α-olefins having a propylene content of 90 to 100 mol % and an ethylene or $C_4$ to $C_{20}$ α-olefin content of 0 to 10 mol %; particularly preferably propylene homopolymer.

The following 1-butene polymers are preferred: 1-butene homopolymer and copolymers of 1-butene and $C_2$ to $C_{20}$ α-olefins (except $C_4$ α-olefin) having a 1-butene content of 50 to 100 mol % and a $C_2$ to $C_{20}$ α-olefin (except $C_4$ α-olefin) content of 0 to 50 mol %; preferably 1-butene homopolymer and copolymers of 1-butene and $C_4$ to $C_{20}$ α-olefins (except $C_4$ α-olefin) having a 1-butene content of 70 to 100 mol % and a $C_2$ to $C_{20}$ α-olefin (except $C_4$ α-olefin) content of 0 to 30 mol %; more preferably 1-butene homopolymer and copolymers of 1-butene and $C_2$ to $C_{20}$ α-olefins (except $C_4$ α-olefin) having a 1-butene content of 90 to 100 mol % and a $C_2$ to $C_{20}$ α-olefin (except $C_4$ α-olefin) content of 0 to 10 mol %; particularly preferably 1-butene homopolymer.

It is necessary that the olefin polymer used in the present invention should satisfy the following physical properties.

(i) The polymer has a mesopentad fraction [mmmm] of 20 to 80 mol %, preferably 30 to 70 mol %, more preferably 30 to 55 mol %, particularly preferably 35 to 50 mol %.

In the case of a 1-butene polymer, the mesopentad fraction [mmmm] is preferably 40 to 85 mol %, more preferably 60 to 80 mol %, particularly preferably 65 to 80 mol %.

As used herein, the mesopentad fraction (mmmm) is as determined in accordance with the method proposed in a report by A. Zambelli, et al., "Maclomolecules", 6925 (1973). Namely, signals attributed to methylene and methyne groups are measured by $^{13}C$ nuclear magnetic resonance spectroscopy to determine the mesopentad fractions [mmmm], [mmrr] and [rmmr]. In the case of 1-butane polymer, the mesopentad fraction is determined in accordance with the method proposed in a report by Asakura et al in "Polymer Journal", 16, 717 (1984) and a report by J. Randall in "Macromol. Chem. Phys.", 198, 1257 (1997). Namely, signals attributed to methylene and methyne groups are measured using $^{13}C$ nuclear magnetic resonance spectroscopy to determine the mesopentad fractions [mmmm], [mmrr] and [rmmr]. Here, the larger mesopentad fraction, the higher the stereoregularity of the polymer.

When the mesopentad fraction is less than 20 mol %, there is a possibility that the master batch composition using such an olefin polymer becomes tacky. When the mesopentad fraction exceeds 80 mol %, the master batch composition using such an olefin polymer has such a high crystallization rate that it is difficult to increase the density of filling of the additives for plastics therein.

It is also preferred that the propylene polymer used in the present invention additionally satisfy the condition that the stereoregularity index [mm] represented by the mesotriad fraction is 50 to 90 mol %, more preferably 50 to 80 mol %.

When the stereoregularity index is less than 50 mol %, there is a possibility that the master batch composition containing such propylene polymer becomes tacky. When the stereoregularity index exceeds 90 mol %, there is a possibility that the secondary processability of a polyolefin resin composition using the master batch composition containing such a propylene polymer is deteriorated.

(ii) The olefin polymer used in the present invention should be a crystalline resin having a melting point of 0 to 100° C., the melting point being (Tm-D) defined as a peak top of a peak observed at the highest temperature side in a fusion endothermic curve obtained using a differential scanning calorimeter by holding 10 mg of a sample at −10° C. for 5 minutes under a nitrogen atmosphere and then elevating the temperature at a rate of 10° C./minute to 220° C. A lower melting point of the olefin polymer is more preferable, since the heating temperature for producing a master batch composition using the olefin polymer can be reduced. An amorphous resin having no melting point is not preferable because the obtained master batch becomes tacky and has a reduced handling efficiency. The melting point is preferably 20 to 90° C., more preferably 45 to 90° C., still more preferably 60 to 90° C., particularly preferably 60 to 80° C.

(iii) The olefin polymer used in the present invention has a weight average molecular weight (Mw), measured by a gel permeation chromatography (GPC) method, of 10,000 to 1,000,000, preferably 10,000 to 150,000, particularly preferably 20,000 to 80,000. When Mw is less than 10,000, the master batch composition containing such an olefin polymer becomes tacky. When Mw exceeds 1,000,000, a polyolefin resin composition using the master batch composition containing such an olefin polymer has such a reduced melt fluidity that the moldability thereof becomes poor.

The olefin polymer used in the present invention should have not only the above-described weight average molecular weight, but also an Mw/Mn ratio of Mw to Mn of 4 or less, wherein Mn is a number average molecular weight thereof measured by the GPC method. When the Mw/Mn ratio exceeds 4, the master batch composition containing such an olefin polymer occasionally becomes tacky.

The Mw/Mn ratio is calculated from the weight average molecular weight (Mw) and number average molecular weight (Mn) which are measured using a GPC measuring device (column: TOSO, GMHHR-H(S)HT; Detector: RI detector for liquid chromatogram, WATERS 150 C).

The olefin polymer used in the present invention may be produced in accordance with the method disclosed in, for example, pamphlet of International Publication No. 03/091289, page 8 to page 9, line 3 or pamphlet of International Publication No. 03/070788, page 15, line 20 to page 17, line 3. Namely, the polymer may be obtained by homopolymerizing a $C_2$ to $C_{20}$ α-olefin, preferably propylene or 1-butene, or by copolymerizing two or more such α-olefins in the presence of a polymerization catalyst containing:

(a) a transition metal compound represented by the general formula (I):

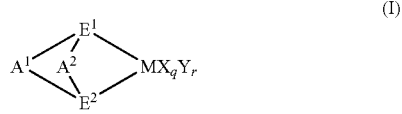

(I)

wherein M represents a metal element belonging to the Groups 3 to 10 of the Periodic Table or to the lanthanoid series, $E^1$ and $E^2$, which may be the same or different and form a crosslinked structure with $A^1$ and $A^2$, each represent a ligand selected from the group consisting of a substituted cyclopentadienyl group, an indenyl group, a substituted indenyl group, a heterocyclopentadienyl group, a substituted heterocyclopentadienyl group, an amide group, a phosphide group, a hydrocarbyl group and a silicon-containing group, X represents a C bonding ligand, and when X is plural, plural X may be the same or different and may be crosslinked with other X, $E^1$, $E^2$ or Y, Y represents a Lewis base, and when Y is plural, plural Y may be the same or different and may be crosslinked with other Y, $E^1$, $E^2$ or X, $A^1$ and $A^2$, which may be the same or different, are each a bivalent crosslinking group bonding two ligands and each represent a $C_1$ to $C_{20}$ hydrocarbyl group, a $C_1$ to $C_{20}$ halogen-containing hydrocarbyl group, a silicon-containing group, a germanium-containing group, a tin-containing group, —O—, —CO—, —S—, —SO$_2$—, —Se—, —NR$^1$—, —PR$^1$—, —P(O)R$^1$—, —BR$^1$— or —AlR$^1$—, where $R^1$ represents a hydrogen atom, a halogen atom, a $C_1$ to $C_{20}$ hydrocarbyl group or a $C_1$ to $C_{20}$ halogen-containing hydrocarbyl group, and plural $R^1$ may be the same or different, q is an integer of 1 to 5 and represents [(valence of M)-2], and r is an integer of 0 to 3; and (b) an organic boron compound.

(C) Polyolefin Resins as Carrier:

The polyolefin resin used as a carrier in the present invention is not specifically limited but is preferably the same as the polyolefin resin used as a molding material in a polyolefin resin composition. A polyolefin resin having a melt flow rate (MFR, temperature: 230° C., load: 21.16 N) of 0.1 to 400 g/10 minutes, preferably 5 to 250 g/10 minutes is suitably selected. When the MFR is less than 0.1 g/10 minutes, the compatibility with the polyolefin resin used as a molding material is deteriorated so that there is a possibility that irregular color is developed in the obtained molded product and the physical properties thereof are adversely affected. When the MFR is greater than 400 g/10 minutes, on the other hand, it is difficult to prepare a master batch composition. Further, there is a possibility that the physical properties, such as mechanical strengths, of the obtained molded product are adversely affected. Commercially available polyolefin resin for carriers may be used for the purpose of the present invention.

(D) Master Batch Composition:

The master batch composition of the present invention is a master batch composition containing 10 to 95% by mass of additives for plastics, 1 to 50% by mass of an olefin polymer having specific physical properties and 1 to 89% by mass of a polyolefin resin as a carrier, more preferably a master batch composition containing 30 to 90% by mass of additives for plastics, 5 to 30% by mass of an olefin polymer having specific physical properties and 5 to 65% by mass of a polyolefin resin as a carrier, still more preferably a master batch composition containing 35 to 85% by mass of additives for plastics, 5 to 25% by mass of an olefin polymer having specific physical properties and 10 to 60% by mass of a polyolefin resin as a carrier. Among them, particularly preferred is a composition in which the olefin polymer not only satisfies the specific physical properties (i) to (iii), but also is a polypropylene polymer which has (iv) a stereoregularity index [mm] of 50 to 90 mol %.

When the proportion of the additives for plastics is less than 10% by mass, then it is practically more effective to directly mix the additives with a polyolefin resin such as polypropylene resin without formation of a master batch. When the amount of the additives for plastics is 95% by mass or more, the viscosity of the master batch composition is so high that the composition cannot be pelletized.

When the amount of the olefin resin is 1% by mass or less, the additives are agglomerated and cause dispersion failure. When the amount is 50% by mass or more, the master batch composition becomes tacky to cause adhesion between pellets of the master batch composition and blocking of a polyolefin molded product obtained by molding a polyolefin resin composition containing the master batch composition.

Method of Preparing Mater Batch Composition:

A method for mixing the additives for plastics, the olefin polymer having specific physical properties and the polyolefin resin as a carrier is not specifically limited. Any conventionally known method using, for example, mixing rolls, intensive mixers such as Banbury mixers, kneaders or single axis or two-axis extruders may be adopted. Multi-step mixing in which the additives for plastics and a part of the olefin polymer are mixed, followed by addition and mixing of the remainder of the olefin polymer may be also adopted.

The master batch composition of the present invention is best suited for use in molding a polypropylene resin composition by injection molding, but may also be used for molding methods other than injection molding, such as an extrusion molding method (concretely a T-die extrusion molding method), a calendar roll molding method, a heat press molding method or an inflation molding method for molding of films and sheets, and a high speed spinning molding method.

Polyolefin Resin Composition

There is no limitation with regard to the polyolefin resin as a molding material for use in the polyolefin resin composition of the present invention. Examples of the polyolefin resin include homopolymers of an α-olefin, copolymers of α-olefins, copolymers of an α-olefin and a vinyl monomer, copolymers of ethylene and an ester of an unsaturated carboxylic acid and copolymers of ethylene and an unsaturated ester of a carboxylic acid. Above all, polypropylene resins such as propylene homopolymer, copolymers of propylene and ethylene or a $C_4$ to $C_{20}$ α-olefin are preferred. These polyolefin resins may be used singly or in combination of two or more thereof.

The compounding amount of the master batch composition to be mixed with the polyolefin resin is preferably 0.1 to 10 parts by mass per 100 parts by mass of the polyolefin resin. An amount of the master batch composition less than 0.1 part by mass fails to obtain an effect for improving the polyolefin resin by the addition of the master batch composition. Too large an amount in excess of 10 parts by mass fails to give an economical advantage of using the master batch composition.

A thermoplastic resin other than the polyolefin resin may be compounded in the polyolefin resin composition of the present invention, as long as the objects of the present invention are not adversely affected. Examples of the thermoplastic resin include polystyrene resins such as polystyrene, rubber-modified polystyrene (HIPS), isotactic polystyrene and syndiotactic polystyrene, polyacrylonitrile resins such as acrylonitrile-styrene resins (AS) and acrylonitrile-butadiene-styrene resins (ABS), polymethacrylate resins, polyamide resins, polyester resins, polycarbonate resins, polyphenylene resins, polyphenylene ether resins, polyphenylene sulfide resins, polyphenylene sulfone resins, rosin resins, terpene resin, chromane-indene resins and petroleum resins. Above all, petroleum resins are preferred. These thermoplastic resins may be used singly or in combination of two or more thereof. The compounding amount of the thermoplastic resin is preferably 0.1 to 100 parts by mass per 100 parts by mass of the polyolefin resin. An amount of the thermoplastic resin less than 0.1 part by mass fails to obtain an effect by the addition of the thermoplastic resin. Too large an amount in excess of 100 parts by mass will adversely affect the characteristics of the polyolefin resin composition.

The polyolefin resin composition of the present invention may contain, if necessary, conventionally known additives, such as a blowing agent, a nucleating agent, a weathering stabilizer, a heat resistance stabilizer, a light stabilizer (hereinafter collectively referred to as stabilizer), a UV absorbing agent, a light stabilizer, a heat resistance stabilizer, an antistatic agent, a mold release agent, a flame retardant, a synthetic oil, wax, an electric property improver, a slip preventing agent, an antiblocking agent, a viscosity controlling agent, a coloring preventing agent, an antifogging agent, a lubricant, a pigment, a dye, a plasticizer, a softening agent, an age inhibitor, a hydrochloric acid absorbing agent, a chlorine capturing agent, an anti-oxidant and a stick preventing agent as long as the objects of the present invention are not adversely affected.

As the stabilizer, there may be mentioned a phenol-type antioxidant, a phosphorus-type antioxidant, a sulfur-type antioxidant, a hindered amine-type stabilizer and a metal salt of a higher fatty acid. These stabilizers may be used in an amount of 0.001 to 10 parts by mass per 100 parts by mass of the polyolefin resin.

As the phenol-type antioxidant, various known phenol-type antioxidants such as 2,6-di-t-butyl-p-cresol (BHT), 2,2'-methylene-bis-(4-methyl-6-t-butylphenol) and tetrakis-[methylene-3-(3',5'-di-t-butyl-4'-hydroxyphenyl) propionate] methane may be used. It is desirable that the above phenol-type antioxidant be used together with a sulfur-type antioxidant. As the sulfur-type antioxidant, various known sulfur-type antioxidants such as dilauryl thiopropionate and distearyl thiodipropionate may be used. For reasons of further improving the inhibitory effect on oxidative degradation, it is preferred that a phosphorus-type antioxidant be used together with the above-described two kinds of the antioxidants. As the phosphorus-type antioxidant, there may be used various known phosphorus-type antioxidants such as triphenyl phosphite, trisnonylphenyl phosphite and cyclic neopentane tetraylbis(2,6-di-t-butyl-4-methyl phenyl) phosphite.

If necessary, a conventionally known filler such as an inorganic filler or an organic filler may be compounded as long as the object of the present invention is not adversely affected.

The shape of the inorganic filler and the organic filler used is not specifically limited and may be any form such as granule, plate, rod, fiber and whisker. As the inorganic filler, there may be mentioned oxides such as silica, diatomaceous earth, barium ferrite, alumina, titanium oxide, magnesium oxide, beryllium oxide, pumice and pumice balloon; hydroxides such as aluminum hydroxide, magnesium hydroxide and basic magnesium carbonate; carbonates such as calcium carbonate, magnesium carbonate, dolomite and dowsonite; sulfates or sulfites such as calcium sulfate, barium sulfate, ammonium sulfate and calcium sulfite; clay minerals, silicates and their organized products (organized clay) such as talc, clay, mica, asbestos, glass fiber, glass flakes, glass balloons, glass beads, calcium silicate, montmorillonite, bentonite and kaolinite; carbonaceous matters such as carbon black, graphite, carbon fiber and hollow carbon spheres; molybdenum sulfide; boron fiber; zinc borate; barium metaborate; calcium borate; sodium borate; magnesium oxysulfate; and various metal fibers. As the organic filler, on the other hand, there may be mentioned, for example, shell fiber such as husk, wooden powder, cotton, jute, paper pieces, cellophane pieces, aromatic polyamide fiber, cellulose fiber, nylon fiber, polyester fiber, polypropylene fiber and thermosetting resin powder.

The above-mentioned inorganic fillers and organic fillers may be used singly or in combination of two or more thereof. Among the above fillers, talc, mica, calcium carbonate and glass fiber are preferred in the case of polyolefin resin composition for injection molding. Particularly preferred is talc. Talc preferably has such a size that the average particle diameter is 1 to 8 μm and the average aspect ratio is at least 4 for reasons of physical properties of molded products obtained from such a composition, such as rigidity, impact resistance, resistance to scratch-whitening, weld appearance and non-uniformity in gloss. Especially preferred are those produced by processing grinding in view of physical properties and rigidity. The compounding amount of the inorganic filler and organic filler is within the range of 1 to 100 parts by mass per 100 parts by mass of the polyolefin resin. When the compounding amount is less than 1 part by mass, the resulting molded product has an insufficient rigidity. When the compounding amount exceeds 100 parts by mass, the resulting molded product causes not only appearance defects such as weld appearance and non-uniform gloss, but also reduction of impact resistance and resistance to scratch-whitening. The compounding amount of the inorganic filler and organic filler is preferably 3 to 60 parts by mass, particularly preferably 5 to 40 parts by mass, per 100 parts by mass of the polyolefin resin from the standpoint of appearance, rigidity, impact resistance and resistance to scratch whitening of the molded products.

EXAMPLES

The present invention will be concretely described below with reference to Examples, but is not to be limited to these Examples.

(1) Measurement of Intrinsic Viscosity

Measured at 135° C. in a tetralin solvent using an automatic viscometer model VMR-053 available from RIGOSHA Co., Ltd.

(2) Measurement of Mesopentad Fraction [mmmm]

Signals of methylene group and methyne group were measured using a $^{13}C$ nuclear magnetic resonance spectroscopy to determine the mesopentad fraction [mmmm] of the polyolefin molecule.

The measurement of the $^{13}C$ nuclear magnetic resonance spectrum was carried out using the following instrument under the conditions specified below.

Apparatus: $^{13}C$-NMR spectrometer Model JNM-EX400 manufactured by JEOL Ltd.
Method: Proton complete decoupling method
Concentration: 220 mg/milliliter
Solvent: 90:10 (by volume) mixed solvent of 1,2,4-trichlorobenzene and deuterated benzene
Temperature: 130° C.
Pulse width: 45°
Pulse interval: 4 seconds
Number of accumulation: 10000

In the present invention the stereoregularity index ([mm]) was determined from the mesotriad fraction ([mm]) of the propylene chains by measuring $^{13}C$-NMR spectrum thereof using the above JNM-EX400 apparatus manufactured by JEOL Ltd. under the same conditions as those described above.

(3) Measurement of Weight Average Molecular Weight (Mw) and Number Average Molecular Weight (Mn)

The weight average molecular weight Mw and the number average molecular weight Mn were determined by GPC method using the following apparatus and the conditions specified below.

GPC apparatus:
Column: TOSO GMHHR-H(S) HT
Detector: RI detector for liquid chromatography, WATERS 150 C
Measurement conditions:
Solvent: 1,2,4-trichlorobenzene
Measuring temperature: 145° C.
Flow rate: 1.0 milliliter/minute
Sample concentration: 2.2 mg/milliliter
Injected amount: 160 microliter
Calibration curve: Universal Calibration
Analysis program: HT-GPC (Ver.1.0)

(4) Measurement of Melting Point (Tm-D)

Using a differential scanning calorimeter (DSC-7 manufactured by Perkin Elmer Inc.), 10 mg of a sample was held at −10° C. for 5 minutes under a nitrogen atmosphere and then the temperature was elevated at a rate of 10° C./minutes to obtain a fusion endothermic curve. The peak top of the peak observed on the highest temperature side is represented as the melting point Tm-D.

Preparation Example 1

(a) Preparation of Catalyst (1) Production of 2-chlorodimethylsilylindene

Under a nitrogen flow, 50 ml of THF (tetrahydrofuran) and 2.5 g (41 mmol) of magnesium were placed in a 1 liter three-necked flask, to which 0.1 ml of 1,2-dibromoethane was added and stirred for 30 minutes to activate magnesium. After stirring, the solvent was withdrawn and 50 ml of THF was newly added. To this, a solution of 5.0 g (25.6 mmol) of 2-bromoindene in THF (200 ml) solution was added dropwise over 2 hours. After the dropwise addition, the mixture was stirred at room temperature for 2 hours and then cooled down to −78° C., to which 3.1 ml (25.6 mmol) of a solution of dichloromethylsilane in THF (100 ml) was added dropwise over one hour. The reaction mixture was then stirred for 15 hours and, thereafter, the solvent was removed by distillation. The residue was extracted with 200 ml of hexane and the solvent was removed by distillation to give 6.6 g (24.2 mmol) of 2-chlorodimethylsilylindene (yield 94%).

(2) Production of (1,2'-dimethylsilylene)(2,1'-dimethylsilylene)-bis(indene)

Under a nitrogen flow, 400 ml of THF and 8 g of 2-chlorodimethylsilylindene were placed in a 1 liter three-necked flask and cooled down to −78° C. To this solution, 38.5 ml (38.5 mmol) of a THF solution (1.0 mol/liter) of Li N (Si Me$_3$)$_2$ was added dropwise. After stirring at room temperature for 15 hours, the solvent was removed by distillation and the residue was extracted with 300 ml of hexane. The solvent was then removed by distillation to give 2.0 g (6.4 mmol) of (1,2'-dimethylsilylene)(2,1'-dimethylsilylene)-bis(indene) (yield 33.4%).

(3) Production of (1,2'-dimethylsilylene)(2,1'-dimethylsilylene)-bis(3-tolylmethylsilylmethylindenyl)zirconium dichloride.

Under a nitrogen flow, 2.5 g (7.2 mmol) of (1,2'-dimethylsilylene)(2,1'-dimethylsilylene)-bis(indene) obtained by (2) and 100 ml of diethyl ether were placed in a Schlenk tube of 200 ml and cooled down to −78° C., to which 9.0 ml (14.8 mmol) of a hexane solution (1.6 mol/liter) of n-butyllithium (n-BuLi) was added. The mixture was then stirred at room temperature for 12 hours. By distilling off the solvent, solids were obtained. The solids were washed with 20 ml of hexane and dried under vacuum to quantitatively obtain a lithium salt as white solids.

The lithium salt of (1,2'-dimethylsilylene)(2,1'-dimethylsilylene)-bis(indene) (6.97 mmol) was dissolved in 50 ml of THF in another Schlenk tube, to which 2.1 ml (14.2 mmol) of iodomethyltrimethylsilane was slowly added dropwise and the mixture was stirred for 12 hours. The solvent was distilled off, to which 50 ml of diethyl ether were added. The solution was washed with a saturated ammonium chloride solution. After separation, the organic phase was dried. The solvent was then removed to obtain 3.04 g (5.9 mmol) of (1,2'-dimethylsilylene) (2,1'-dimethylsilylene)-bis(3-trimethylsilylmethylindene) (yield 84%).

Under a nitrogen flow, 3.04 g (5.9 mmol) of the obtained (1,2'-dimethylsilylene) (2,1'-dimethylsilylene)-bis(3-trimethylsilylmethylindene) and 50 ml of diethyl ether were placed in a Schlenk tube and cooled down to −78° C., to which 7.4 ml (11.8 mmol) of a hexane solution (1.6 mol/liter) of n-butyllithium (n-BuLi) was added. The mixture was then stirred at room temperature for 12 hours. By distilling off the solvent, solids were obtained. The solids were washed with 40 ml of hexane to obtain 3.06 g of a lithium salt as a diethyl ether adduct.

The results of $^1$H-NMR (90 MHz, THF-d8) were as follows: δ 0.04 (s, —SiMe$_3$, 18H), 0.48 (s, -Me$_2$Si—, 12H), 1.10 (t, —CH$_3$, 6H), 2.59 (s, —CH$_2$—, 4H), 3.38 (q, —CH$_2$—, 4H), 6.2-7.7 (m, Ar—H, 8H).

Under a nitrogen flow, 3.06 g of the lithium salt obtained above were suspended in 50 ml of toluene and cooled to −78° C., to which a suspension of 1.2 g (5.1 mmol) of zirconium tetrachloride in 20 mol of toluene, previously cooled to −78° C., was added dropwise. After the dropwise addition, the mixture was stirred at room temperature for 6 hours. The solvent of the reaction mixture was distilled off and the residue was recrystallized from dichloromethane to give 0.9 g (1.33 mmol) of (1,2'-dimethylsilylene) (2,1'-dimethylsilylene)-bis(3-trimethylsilylmethylindenyl)zirconium dichloride as yellow fine crystals (yield: 26%).

The results of $^1$H-NMR (90 MHz, CDCl$_3$) were as follows:
δ 0.0 (s, —SiMe$_3$—, 18H), 1.0$_2$, 1.12 (s, -Me$_2$Si—, 12H), 2.51 (dd, —CH$_2$—, 4H), 7.1-7.6 (m, Ar—H, 8H).

(b) Polymerization

In a 1 liter autoclave which had been dried by heating, 200 ml of heptane, 200 ml of 1-butene, 0.2 mmol of triisobutylaluminum and 2 μmol of dimethylanilinium borate were placed, to which 0.05 Pa of hydrogen was introduced. With stirring, the temperature was raised to 80° C. and then 0.4 μmol of (1,2'-dimethylsilylene) (2,1'-dimethylsilylene)-bis(3-trimethylsilylmethylindenyl)zirconium dichloride was added. The mixture was then polymerized for 60 minutes. After the polymerization was over, the reaction product was dried under vacuum to obtain 90 g of 1-butene polymer as an olefin polymer. The properties of the obtained 1-butene polymer are shown in Table 1.

Preparation Example 2

Production of Low Molecular Weight Propylene Polymer

To a stainless steel reactor having an inside volume of 0.25 m$^3$ and equipped with a stirrer, 20 liter/h of n-heptane, 16 mmol/h of triisobutylaluminum, 15 mmol/h of methylaluminoxane and 15 μmol/h of (1,2'-dimethylsilylene) (2,1'-dimethylsilylene)-bis(3-trimethylsilylmethylindenyl)zirconium dichloride were continuously fed. Propylene and hydrogen were continuously fed while maintaining the polymerization temperature at 60° C., the hydrogen concentration in the gas phase at 54 mol % and the total pressure within the reactor at 0.75 MPa·G. The polymerization solution was continuously discharged. The obtained polymerization solution was mixed with IRGANOX 1010 (manufactured by Ciba Specialty Chemicals Inc.) in an amount of 500 ppm. The solvent was removed at a jacket temperature of 200° C. to obtain a low molecular weight propylene polymer having a stereoregularity index [mm] of 58 mol %.

TABLE 1

|  | Preparation Example 1 | Preparation Example 2 |
|---|---|---|
| [η] (dl/g) | 0.39 | 0.32 |
| Mw (in terms of PB) | 60000 | 33000 |
| Mw/Mn | 2.0 | 1.80 |
| Tm-D (° C.) | 68 | 70 |
| (mmmm) (mol %) | 68.8 | 44.6 |

Example 1

Using Labo Plast Mill dual axis extruder (manufactured by Toyo Seiki Seisakusho, Ltd.), 250 g of a polypropylene resin (Y6005GM manufactured by Idemitsu Kosan Co., Ltd.), 200 g of carbon black (Black Pearls 800 manufactured by Cabot, Inc.) and 50 g of the olefin polymer (low molecular weight propylene polymer), obtained in Preparation Example 2, as a dispersing agent, were melted and kneaded at 200° C. and at a screw revolution rate of 280 rpm, while deaerating through vents, thereby obtaining pellets of a master batch composition. The discharging rate at an exit of the die was measured and shown in Table 2.

The pigment dispersion efficiency of the obtained pigment master batch pellets were measured in the following manner.

100 Parts by mass of polypropylene (J-950HP manufactured by Idemitsu Kosan Co., ltd.) and 2 parts by mass of the prepared pigment master batch pellets were dry-blended to prepare a polypropylene resin composition. Using the thus obtained composition, injection molded products were produced under the following conditions.

Injection molding machine: IS200CN manufactured by Toshiba Kikai Co., Ltd. (mold clamping force: 200 t)
Mold: flat plate of 420×100×3 mm
Resin temperature: 220° C.
Mold temperature: 45° C.
Filling time: 5 seconds
Back pressure: 588 kPa (Gauge pressure)
Dwell: 5 seconds filling pressure×0.7
Dwell time: 5 seconds
Cooling time: 25 seconds Three surface portions each having an area of 2 cm×2 cm of each of samples of the produced injection-molded products were arbitrarily selected. The number of pigment lumps present in each of the surface portions was measured using PROFILE PROJECTOR V-24B manufactured by Nikon Corporation.

An average of the numbers of the pigment lumps of the three measured portions was calculated and expressed in terms of the number per unit area (average number (number/cm$^2$)).

Example 2

Procedures of Example 1 were conducted in the same manner as described except that carbon black in Example 1 was substituted with Vulcan 9A32 (Cabot Inc.)

Example 3

Procedures of Example 1 were conducted in the same manner as described except that 1-butene polymer obtained in Preparation Example 1 was used as the olefin polymer in Example 1.

Comparative Example 1

Using Labo Plast Mill dual axis extruder (manufactured by Toyo Seiki Seisakusho, Ltd.), 250 g of a polypropylene resin (Y6005GM manufactured by Idemitsu Kosan Co., Ltd.) and 250 g of carbon black (Black Pearls 800 manufactured by Cabot, Inc.) were melted and kneaded at 200° C. and at a screw revolution rate of 280 rpm, while deaerating through vents, thereby obtaining pellets of a pigment master batch composition. The discharging rate at an exit of the die was measured and shown in Table 2. The pigment dispersion efficiency of the obtained pigment master batch pellets were measured in the same manner as that in Example 1.

Comparative Example 2

Using Labo Plast Mill dual axis extruder (manufactured by Toyo Seiki Seisakusho, Ltd.), 250 g of a polypropylene resin (Y6005GM manufactured by Idemitsu Kosan Co., Ltd.), 50 g of Biscol P660 (olefin copolymer having Tm-D of about 130° C., manufactured by Sanyo Chemical Industry Ltd.) and 200 g of carbon black (Black Pearls 800 manufactured by Cabot, Inc.) were melted and kneaded at 200° C. and at a screw revolution rate of 280 rpm, while deaerating through vents, thereby obtaining pellets of a pigment master batch composition. The discharging rate at an exit of the die was measured and shown in Table 2. The pigment dispersion efficiency of the obtained pigment master batch pellets were measured in the same manner as that in Example 1.

TABLE 2

|  | Olefin copolymer | | Polypropylene resin % by mass | Additive % by mass | Discharge rate (kg/h) | Average number (/cm²) |
|---|---|---|---|---|---|---|
|  | Kind | % by mass | | | | |
| Example 1 | Preparation Example 2 | 10 | 50 | 40 | 1.6 | 27.2 |
| Example 2 | Preparation Example 2 | 10 | 50 | 40 | 1.7 | 9.3 |
| Example 3 | Preparation Example 1 | 10 | 50 | 40 | 1.7 | 29.0 |
| Comparative Example 1 | — | 0 | 50 | 50 | 1.8 | 44.1 |
| Comparative Example 2 | Biscol | 10 | 50 | 40 | 1.6 | 39.5 |

Example 4

Using a single axis extruder (manufactured by Tsukata Juki Seisakusho Co., Ltd.) of a 20 mm diameter, 90 g of the olefin polymer obtained in Preparation Example 2, 90 g of LDPE (L1885 manufactured by Asahi Kasei Corporation) and 120 g of a blowing agent (SERBON SK-C manufactured by Eiwa Kasei Co., Ltd.) were kneaded at a cylinder temperature of 100° C. and at a screw revolution rate of 1,100 rpm, thereby obtaining pellets. A sample (0.5 g) of the thus obtained pellets was set in a heating furnace of a Karl Fischer's device in air and was heated at 150° C. after closure. The gas generated upon the heating was caught in a 25 ml water-sealed measuring cylinder and collected therein for 16 minutes with the water levels inside and outside the measuring cylinder being equal. Similar measurement was performed without the sample to obtain a blank. The amount of the generated gas was obtained by subtracting the blank from the amount of the collected gas and was found to be 18.7 ml/g. It was confirmed that the blowing agent was contained in the pellets.

Comparative Example 3

Example 4 was repeated without using the olefin polymer prepared in Preparation Example 2. Using a single axis extruder (manufactured by Tsukata Juki Seisakusho Co., Ltd.) of a 20 mm diameter, 240 g of LDPE (L1885 manufactured by Asahi Kasei Corporation) and 60 g of a blowing agent (SERBON SK-C manufactured by Eiwa Kasei Co., Ltd.) were kneaded at a cylinder temperature of 180° C. Because of significant foaming within the extruder, kneading was not able to be carried out. Sample pellets were unable to be obtained.

Comparative Example 4

Using a single axis extruder (manufactured by Tsukata Juki Seisakusho Co., Ltd.) of a 20 mm diameter, 240 g of the olefin polymer obtained in Preparation Example 2, 60 g of a blowing agent (SERBON SK-C manufactured by Eiwa Kasei Co., Ltd.) were kneaded at a cylinder temperature of 100° C. and at a screw revolution rate of 1,100 rpm, and pelletization was attempted. However, because of cuffing of strands, pelletization was performed in a significant difficulty.

A sample (0.5 g) of the thus obtained pellets was set in a heating furnace of a Karl Fischer's device in air and was heated at 150° C. after closure. The gas generated upon the heating was caught in a 25 ml water-sealed measuring cylinder and collected therein for 16 minutes with the water levels inside and outside the measuring cylinder being equal. Similar measurement was performed without the sample to obtain a blank. The amount of the generated gas was obtained by subtracting the blank from the amount of the collected gas and was found to be 10.5 ml/g.

INDUSTRIAL APPLICABILITY

According to the present invention, it is possible to provide a master batch composition useful for the production of injection molded products of a polyolefin resin, particularly a polypropylene resin, more specifically a master batch composition which can improve dispersibility of additives in a polyolefin molded product particularly a polypropylene molded product, which permits high density filling of various additives in the master batch composition, which can suppress thermal deterioration and reactions of the various additives during the production of the master batch composition and which is free of blocking and shows good process efficiency, to provide a polyolefin resin composition containing the master batch composition, and to provide a polyolefin molded product using the resin composition.

The invention claimed is:

1. A master batch composition comprising 35 to 85% by mass of an additive for plastics, 5 to 25% by mass of an olefin polymer which satisfies conditions (i) to (iii) shown below, and 10 to 60% by mass of a polyolefin resin as a carrier,
   (i) the polymer has a mesopentad fraction [mmmm] of 20 to 80 mol %,
   (ii) the polymer has a melting point (Tm-D) of 0 to 100° C., defined as a peak top of a peak observed at the highest temperature side in a fusion endothermic curve obtained using a differential scanning calorimeter (DSC) by holding a sample at −10° C. for 5 minutes under a nitrogen atmosphere and then elevating the temperature at a rate of 10° C./minute, and
   (iii) the polymer has a weight average molecular weight (Mw), measured by a gel permeation chromatography (GPC) method, of 10,000 to 1,000,000 and a Mw/Mn ratio of Mw to Mn of 4 or less, wherein Mn is a number average molecular weight thereof measured by the GPC method.

2. The master batch composition as claimed in claim 1, wherein the olefin polymer is a propylene polymer additionally satisfying the following condition (iv):
   (iv) the polymer has a stereoregularity index [mm] of 50 to 90 mol %.

3. A polyolefin resin composition comprising a polyolefin resin and a master batch composition of claim 1 compounded therein.

4. A polyolefin resin composition comprising a polyolefin resin and a master batch composition of claim 2 compounded therein.

5. A polyolefin resin composition comprising a polyolefin resin and a master batch composition of claim 1 compounded therein, wherein the master batch composition is compounded in an amount of 0.1 to 10 parts by mass per 100 parts by mass of the polyolefin resin.

6. A polyolefin resin composition comprising a polyolefin resin and a master batch composition of claim 2 compounded therein, wherein the master batch composition is compounded in an amount of 0.1 to 10 parts by mass per 100 parts by mass of the polyolefin resin.

7. The polyolefin resin composition as claimed in claim 3, wherein the polyolefin resin is a polypropylene resin.

8. The polyolefin resin composition as claimed in claim 4, wherein the polyolefin resin is a polypropylene resin.

9. A polyolefin molded product of a polyolefin resin composition as claimed in claim 3.

10. A polyolefin molded product of a polyolefin resin composition as claimed in claim 4.

11. A polyolefin molded product of a polyolefin resin composition as claimed in claim 5.

12. A polyolefin molded product of a polyolefin resin composition as claimed in claim 6.

13. A polyolefin molded product of a polyolefin resin composition as claimed in claim 7.

14. A polyolefin molded product of a polyolefin resin composition as claimed in claim 8.

15. A polyolefin molded product for automobiles obtained by injection molding a polyolefin resin composition as claimed in claim 3.

16. A polyolefin molded product for automobiles obtained by injection molding a polyolefin resin composition as claimed in claim 4.

17. A polyolefin molded product for automobiles obtained by injection molding a polyolefin resin composition as claimed in claim 5.

18. A polyolefin molded product for automobiles obtained by injection molding a polyolefin resin composition as claimed in claim 6.

19. A polyolefin molded product for automobiles obtained by injection molding a polyolefin resin composition as claimed in claim 7.

20. A polyolefin molded product for automobiles obtained by injection molding a polyolefin resin composition as claimed in claim 8.

21. The master batch composition as claimed in claim 1, wherein the additive is at least one selected from the group consisting of a blowing agent, a nucleating agent, a weathering stabilizer, a heat resistance stabilizer, a light stabilizer, a UV absorbing agent, a heat resistance stabilizer, an antistatic agent, a mold release agent, a flame retardant, a synthetic oil, a wax, an electric property improver, a slip preventing agent, an anti-blocking agent, a viscosity control agent, a color prevention agent, an anti-fogging agent, a lubricant, a pigment, a dye, a plasticizer, a softening agent, an age inhibitor, a hydrochloric acid absorbing agent, a chlorine capturing agent, an anti-oxidant and a stick-preventing agent.

22. The master batch composition as claimed in claim 1, wherein the additive is a pigment.

23. The master batch composition as claimed in claim 1, wherein the master batch consists of the olefin polymer, the polyolefin resin, and the additive for plastics.

24. The master batch composition as claimed in claim 23, wherein the additive for plastics, the olefin polymer and the polyolefin resin are homogeneously mixed.

25. The master batch composition as claimed in claim 1, wherein the master batch composition has a dispersion efficiency such that an injection molded flat plate having a 2 cm×2 cm surface has an average of 29.0 or less pigment lumps/cm$^2$.

26. The master batch composition as claimed in claim 1, wherein the composition has a dispersion efficiency of from 9.3 to 29.0 pigment lumps/cm$^2$.

* * * * *